(12) United States Patent
Suda et al.

(10) Patent No.: US 9,144,364 B2
(45) Date of Patent: Sep. 29, 2015

(54) CLEANING TOOL AND CLEANING SHEET

(75) Inventors: Tomokazu Suda, Kanonji (JP); Satoshi Hasegawa, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 274 days.

(21) Appl. No.: 13/883,656

(22) PCT Filed: Nov. 7, 2011

(86) PCT No.: PCT/JP2011/075641
§ 371 (c)(1),
(2), (4) Date: Jul. 26, 2013

(87) PCT Pub. No.: WO2012/063790
PCT Pub. Date: May 18, 2012

(65) Prior Publication Data
US 2013/0291324 A1    Nov. 7, 2013

(30) Foreign Application Priority Data

Nov. 11, 2010 (JP) ................................. 2010-253311

(51) Int. Cl.
*A47L 13/17* (2006.01)
*A47L 13/20* (2006.01)

(52) U.S. Cl.
CPC *A47L 13/17* (2013.01); *A47L 13/20* (2013.01)

(58) Field of Classification Search
CPC ......... A47L 13/16; A47L 13/17; A47L 13/20; A47L 1/15; C11D 17/049; A61K 8/0208; B08B 1/006; A47K 7/03; B32B 5/22; B32B 2432/00
See application file for complete search history.

(56) References Cited

U.S. PATENT DOCUMENTS

| | | | |
|---|---|---|---|
| 5,960,508 A | 10/1999 | Holt et al. | |
| 7,516,510 B2 * | 4/2009 | Tanaka | 15/228 |
| 7,553,783 B2 * | 6/2009 | Tanaka | 442/327 |
| 8,938,842 B2 * | 1/2015 | Hasegawa et al. | 15/228 |
| 8,943,642 B2 * | 2/2015 | Hasegawa et al. | 15/228 |
| 2003/0045197 A1 | 3/2003 | Kakiuchi et al. | |
| 2005/0136775 A1 | 6/2005 | Tanaka | |

FOREIGN PATENT DOCUMENTS

| | | |
|---|---|---|
| JP | 2001-506519 A | 5/2001 |
| JP | 2001-198066 A | 7/2001 |
| JP | 2005-185824 A | 7/2005 |

OTHER PUBLICATIONS

International preliminary report on patentability mailed May 23, 2013, corresponds to PCT/JP2011/075641.

(Continued)

*Primary Examiner* — Laura C Guidotti
(74) *Attorney, Agent, or Firm* — Lowe Hauptman & Ham, LLP

(57) ABSTRACT

In a wet sheet, hydrophobic outer layer sheets are disposed on both sides of the hydrophilic inner layer sheet impregnated with cleaning solution. Each of intermediate layer sheets is folded over so as to form a space having an opening. End portions of the inner layer sheet are inserted into the spaces of the intermediate layer sheets. The inner layer sheet can come in contact with the outer layer sheet via a space between the intermediate layer sheets. With such a construction, sufficiently high frictional force acts between the inner layer sheet and the outer layer sheet.

9 Claims, 9 Drawing Sheets

(56) References Cited

OTHER PUBLICATIONS

Office Action mailed Nov. 5, 2014, corresponding to Japanese patent application No. 2010-253311.

International Search Report and Written Opinion for PCT/JP2010/075641 dated Feb. 7, 2012.

Office Action dated Jan. 7, 2015, corresponding to Chinese patent application No. 201180054162.8.

* cited by examiner

CLEANING TOOL AND CLEANING SHEET

RELATED APPLICATIONS

The present application is a National Phase of International Application Number PCT/JP2011/075641, filed Nov. 7, 2011, and claims priority from Japanese Application Number 2010-253311, filed Nov. 11, 2010.

BACKGROUND OF THE INVENTION

1. Field of the Invention

This invention relates to a cleaning tool and a cleaning sheet, and more particularly to a cleaning tool and a cleaning sheet which can be suitably used for wiping an object to be cleaned, such as floor.

2. Description of the related Art

Japanese non-examined laid-open Patent Publication No. 2001-198066 discloses a cleaning sheet having an inner layer sheet and outer layer sheets disposed on both sides of the inner layer sheet. The inner layer sheet and the outer layer sheets have substantially the same surface area and are integrated with each other by bonded portions formed by embossing. Further, the inner layer sheet is impregnated with cleaning solution. In use, the cleaning sheet is attached, for example, to a cleaning sheet mounting member. In order to attach the cleaning sheet to the cleaning sheet mounting member, typically, a central portion of the cleaning sheet is placed on a cleaning side of the cleaning sheet mounting member and both ends of the central portion are removably held by holding members of the cleaning sheet mounting member. By using such a cleaning sheet, an object to be cleaned can be cleaned in a wetted state.

SUMMARY OF THE INVENTION

In a cleaning sheet (so-called "wet sheet") which is used to clean an object to be cleaned in a wetted state, it is necessary to appropriately set the property of releasing cleaning solution from an outer surface of an outer layer sheet. Particularly, in the cleaning sheet formed by outer layer sheets and an inner layer sheet which is disposed between the outer layer sheets and impregnated with cleaning solution, the property of releasing the cleaning solution from outer surfaces of the outer layer sheets varies according to the property of releasing the cleaning solution from the inner layer sheet to the outer layer sheets.

In the above-mentioned known cleaning sheet, the inner layer sheet and the outer layer sheets are bonded together by a number of bonded portions which are formed by embossing. With the construction in which the cleaning solution is released via the bonded portions, if the inner layer sheet and the outer layer sheets are bonded by a number of bonded portions, a large amount of cleaning solution is released from the inner layer sheet to the outer layer sheets via the bonded portions. Therefore, it is preferable to minimize the bonded portions for bonding the inner layer sheet and the outer layer sheets. Further, in order to realize appropriate setting of the property of releasing cleaning solution from the outer surfaces of the outer layer sheets, it is preferable that the inner layer sheet is hydrophilic and the outer layer sheets are hydrophobic.

Further, it is sometimes required that an intermediate layer sheet is disposed between the inner layer sheet and the outer layer sheet. For example, in order to make it easier for a user to place the central portion of the cleaning sheet on the cleaning side of the cleaning sheet mounting member, it is sometimes required that a colored intermediate layer sheet is disposed in a region of the central portion of the cleaning sheet. In this case, it is conceivable that the intermediate layer sheet is disposed between the inner layer sheet and the outer layer sheet and the number of the bonded portions for bonding the inner layer sheet, the intermediate layer sheet and the outer layer sheets together is minimized.

In this case, if the intermediate layer sheet is a sheet in which a frictional force acting between the intermediate layer sheet and the outer layer sheet is low and the number of the bonded portions which bond the inner layer sheet, the intermediate layer sheet and the outer layer sheets together is minimized, the outer layer sheet may become wrinkled during cleaning operation. Specifically, part of the outer layer sheet is displaced with respect to the intermediate layer sheet by frictional force between the object to be cleaned and the outer layer sheet, so that the outer layer sheet may become wrinkled. If the outer layer sheet becomes wrinkled, the cleaning operation may not be satisfactorily performed.

Accordingly, it is an object of this invention to provide a technique for disposing an intermediate layer sheet between an outer layer sheet and an inner layer sheet, while preventing the outer layer sheet from becoming wrinkled during cleaning operation.

One aspect of the invention relates to a cleaning tool having a cleaning sheet mounting member and a cleaning sheet. The cleaning sheet mounting member has a cleaning side and a holding member. The cleaning sheet has a central portion which is placed on the cleaning side of the cleaning sheet mounting member and an end portion which is formed on at least one side of the central portion in one direction and removably held by the holding member. Typically, the end portion is formed on both sides of the central portion.

In this invention, the central portion of the cleaning sheet has a hydrophobic first sheet, a hydrophobic second sheet, a hydrophilic third sheet and a fourth sheet. The third sheet is impregnated with cleaning solution and disposed between the first sheet and the second sheet. At least part of the fourth sheet is disposed between the first sheet and the third sheet such that part of the third sheet can come in contact with the first sheet.

It is essential for the first sheet and the second sheet to be hydrophobic as a whole, and they may be formed of hydrophobic material and hydrophilic material. Typically, a nonwoven fabric sheet is used as the first sheet and the second sheet. Further, it is essential for the third sheet to be hydrophilic as a whole, and it may be formed of hydrophobic material and hydrophilic material. Suitably, the third sheet is formed only of hydrophilic material. Typically, a nonwoven fabric sheet is used as the third sheet. The fourth sheet may be formed by a hydrophobic sheet as a whole, or it may be formed by a hydrophilic sheet as a whole. Further, the fourth sheet may be formed by a nonwoven fabric sheet, or it may be formed by a synthetic resin sheet (film). In the case of the synthetic resin film, the fourth sheet has to be designed such that cleaning solution impregnated in the third sheet can be released to the first sheet. For example, a film having an opening through which the cleaning solution can pass is used as the fourth sheet. The second sheet and the fourth sheet may be impregnated with cleaning solution. The first sheet corresponds to a sheet which comes in contact with an object to be cleaned (a sheet disposed on the side facing away from the cleaning side of the cleaning sheet mounting member) when the central portion of the cleaning sheet is placed on the cleaning side of the cleaning sheet mounting member.

The first to fourth sheets are bonded at appropriate areas or points by an appropriate bonding method. Typically, the first to fourth sheets are bonded via bonded portions formed by hot embossing. Further, preferably, the bonding areas are set with consideration of the amount (property) of release of the cleaning solution impregnated in the hydrophilic third sheet to the first and second sheets (particularly, the first sheet) via the bonded portions.

The end portion of the cleaning sheet can be formed by using the first to third sheets. For example, it can be formed by using the first and second sheets or by using the first to third sheets. With the construction in which the end portion of the cleaning sheet is formed by the first and second sheets, when the user locks the end portion of the cleaning sheet by the holding member or removes it from the holding member, the user's hand, for example, can be prevented from contacting the cleaning solution. The sheets forming the end portion of the cleaning sheet are bonded at appropriate areas or points by an appropriate bonding method. Further, the number of the bonding areas or points and the area of bonding may be set without so much consideration of the amount of release of the cleaning solution from the third sheet.

In this invention, with the construction in which high frictional force acts between the hydrophilic third sheet and the hydrophobic first sheet, even if frictional force acting between the fourth sheet and the first sheet is lower than frictional force between the object to be cleaned and the first sheet, the first sheet can be prevented from becoming wrinkled during cleaning operation.

An appropriate manner can be used to dispose the fourth sheet between the first sheet and the third sheet.

In one manner, the fourth sheet is folded over along a folding line so as to form a space having an opening (to have a U-shaped or V-shaped section), and an end portion of the third sheet is inserted into the space of the fourth sheet so that part of the fourth sheet is overlaid on the third sheet. In this case, one of the end portions of the third sheet in one direction may be inserted into one space of the fourth sheet, or the both end portions of the third sheet may be inserted into the two spaces of the fourth sheet. In this manner, a portion of the third sheet which is not overlaid on the fourth sheet can come in contact with the first sheet.

In another manner, the fourth sheet having an opening is disposed between the first sheet and the third sheet. The fourth sheet may have the same surface area as the third sheet, or it may have a different (larger or smaller) surface area from the first sheet. Further, the shape and number of the openings of the fourth sheet can be appropriately selected. In this manner, a portion of the third sheet which faces the opening of the fourth sheet can come in contact with the first sheet via the opening. It may be designed such that the fourth sheet has a smaller surface area than the third sheet and a portion of the third sheet which is not overlaid on the fourth sheet come in contact with the first sheet.

In a different manner, a plurality of fourth sheets having a smaller surface area than the third sheet are disposed between the first sheet and the third sheet and spaced apart from each other. The shape and size of the fourth sheets can be appropriately selected. In this manner, the third sheet can come in contact with the first sheet via spaces defined between adjacent ones of the fourth sheets.

The other aspect of the invention relates to a cleaning sheet attached to a cleaning sheet mounting part. The cleaning sheet has a central portion and an end portion formed on at least one side of the central portion in one direction. The central portion of the cleaning sheet is placed on a cleaning side of a cleaning sheet mounting member and the end portion of the cleaning sheets is removably held by a holding member of the cleaning sheet mounting member.

The central portion of the cleaning sheet according to this invention has the above-described first to fourth sheets. The third sheet is impregnated with cleaning solution and disposed between the first sheet and the second sheet. Further, at least part of the fourth sheet is disposed between the first sheet and the third sheet such that part of the third sheet can come in contact with the first sheet.

In a cleaning tool and a cleaning sheet of this invention, a fourth sheet can be disposed between a first sheet and a third sheet while preventing the first sheet from becoming wrinkled during cleaning operation.

DETAILED DESCRIPTION OF THE INVENTION

An embodiment of this invention is now described with reference to the drawings. In this embodiment, a cleaning tool having a cleaning sheet mounting member and a cleaning sheet attached to the cleaning sheet mounting member is now explained. Further, a cleaning sheet is explained which is used in a wetted state to clean an object to be cleaned.

Naturally, the following cleaning sheet may also be used singly (without being attached to the cleaning sheet mounting member of the cleaning tool) to clean an object to be cleaned. Further, the cleaning sheet or the cleaning tool of this invention can be used to clean objects having various shapes, such as planar, curved, uneven or stepped shape.

Further, in the following description, a horizontal direction as viewed in FIGS. 2 and 3 (a direction along folding lines 201, 202, 220*b*, 230*b*) or a direction along the arrow y is referred to as the "length direction", and a vertical direction as viewed in FIGS. 2 and 3 (a direction transverse to the folding lines 201, 202, 220*b*, 230*b*) or a direction along the arrow x is referred to as the "width direction". The "width direction" in this embodiment corresponds to the "one direction" according to this invention.

Figure 1:
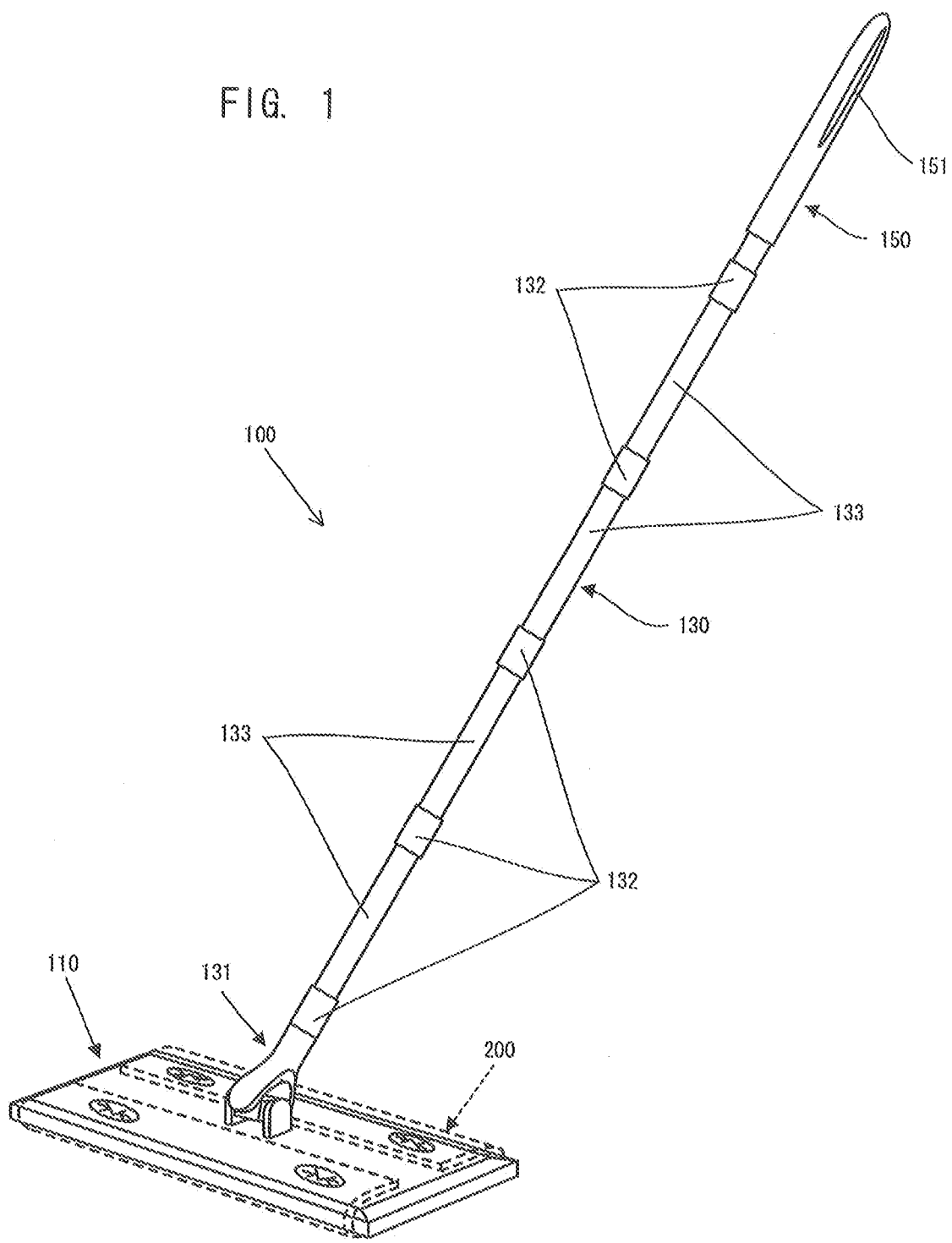
FIG. 1 is a perspective view showing an embodiment of a cleaning tool.

FIG. 1 is a perspective view showing an embodiment of a cleaning tool 100 according to this invention. The cleaning tool 100 of this embodiment has a head 100 to which a cleaning sheet 200 is attached, a pipe 130 and a handle 150. The pipe 130 is formed by coupling a plurality of pipe elements 133 via coupling mechanisms. Each of the coupling mechanisms includes, for example, a male coupling element provided on one end of one pipe element and a female coupling element provided on the other end of the other pipe element. A connection between the male coupling element and the female coupling element is covered with a cover 132. The one end of the pipe 130 is connected to the handle 150. The other end of the pipe 130 is connected to a connecting mechanism 131 provided on the head 110. In this embodiment, the head 110, the handle 150 and the pipe 130 are features that correspond to the "cleaning sheet mounting member", the "holding member" and the "connecting member for connecting the head and the handle", respectively, according to this invention. The number of the pipe elements 133 forming the pipe 130 can be appropriately selected. Further, the handle 150 may also be directly connected to the connecting mechanism 131 provided on the head 110.

Figure 2:
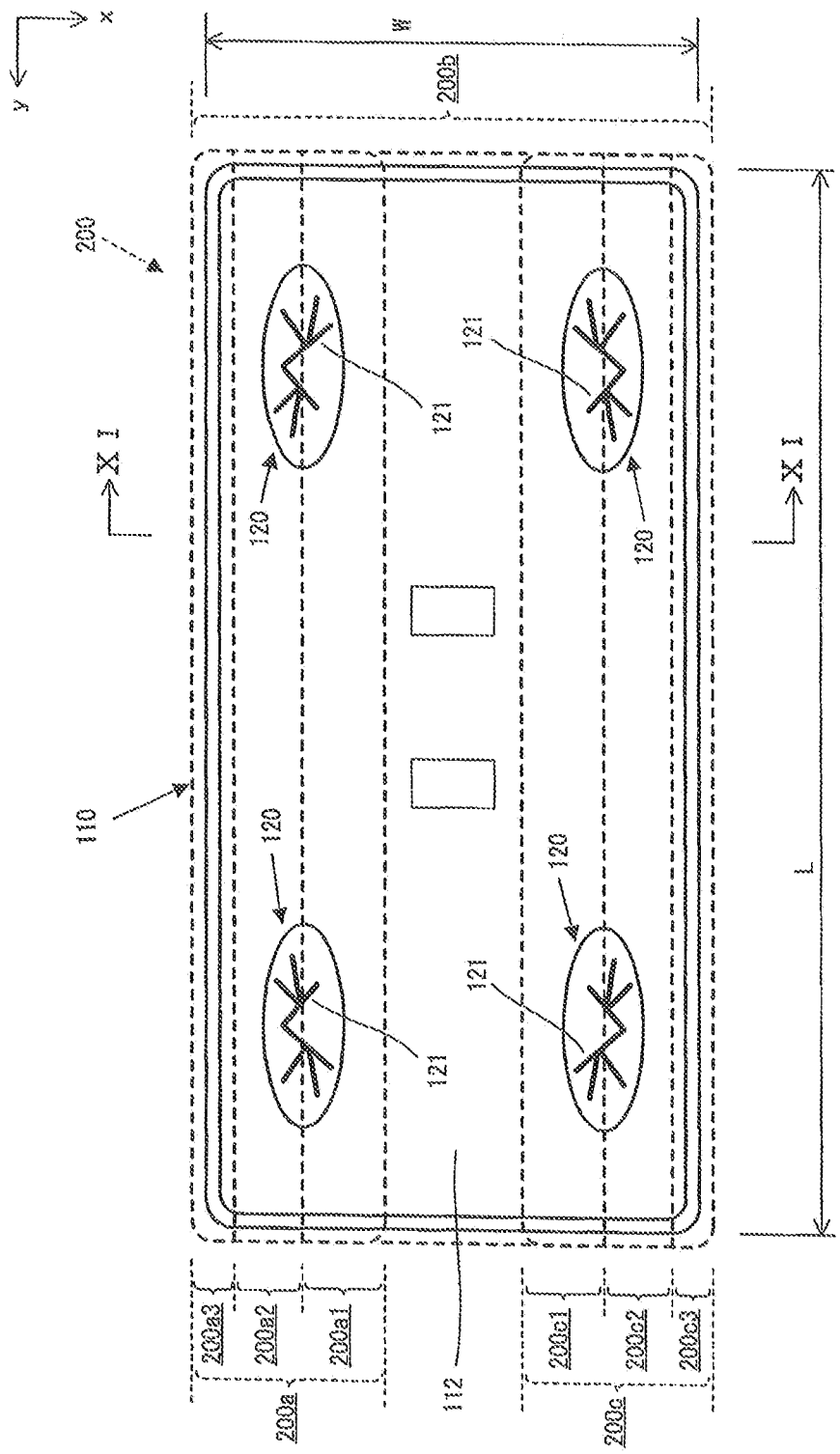
FIG. 2 is a plan view of a head.

The head 110 is shaped like a plate as shown in FIG. 2 and has an upper side 112 on which the connecting mechanism 131 is mounted, and a lower side (mounting side or cleaning side) 111 (see FIG. 11) opposite to the upper side 112. Holding members 120 are provided on the upper side 112. As shown in FIG. 2, each of the holding members 120 has a plurality of elastic holding pieces 121 which are defined by cuts.

Figure 5:
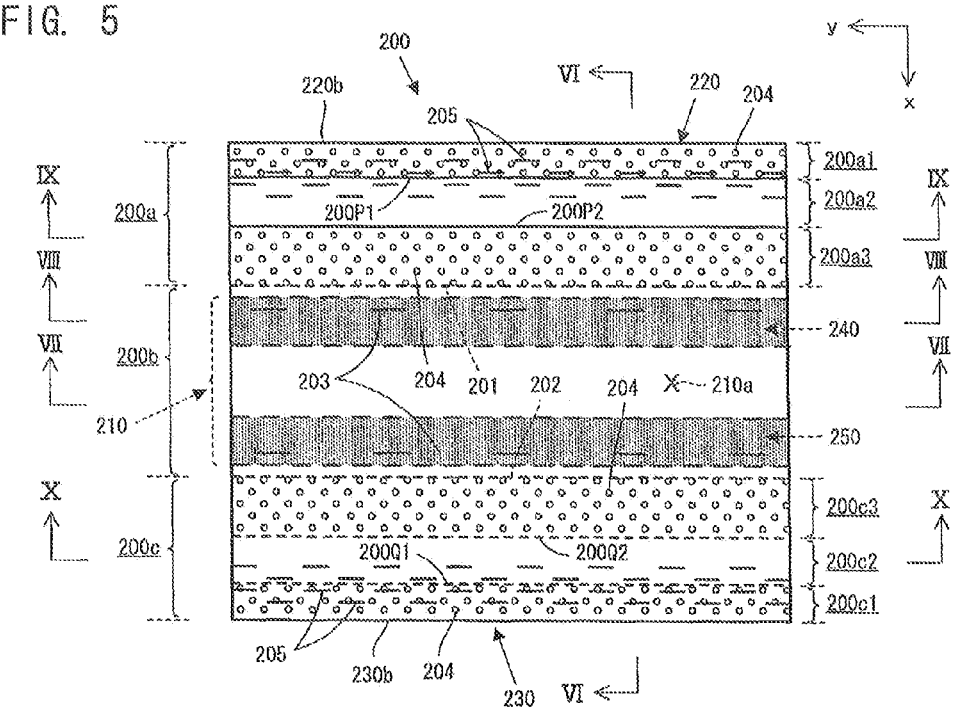
FIG. 5 shows the cleaning sheet 200 of the first embodiment in an unfolded state.
Figure 6:
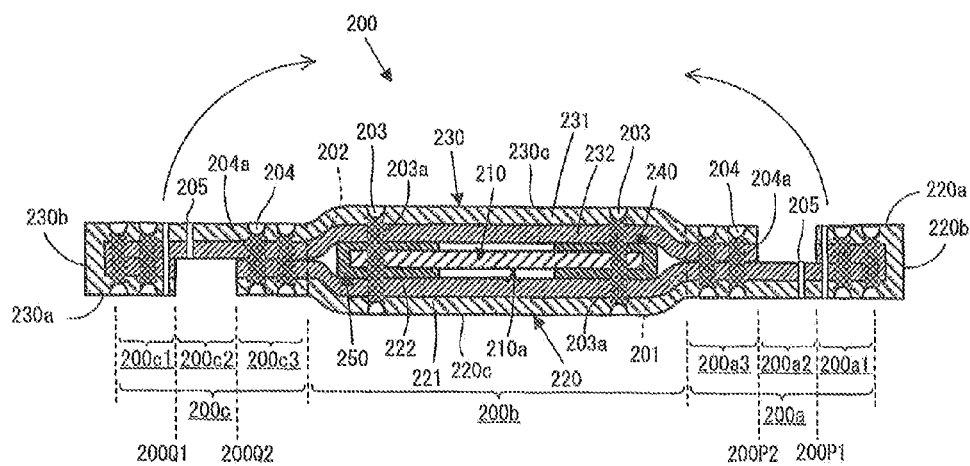
FIG. 6 is a sectional view taken along line VI-VI in FIG. 5.
Figure 7:
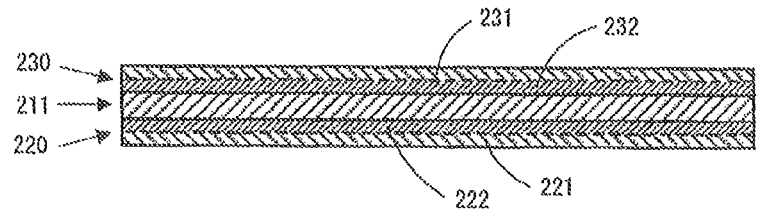
FIG. 7 is a sectional view taken along line VII-VII in FIG. 5.
Figure 8:
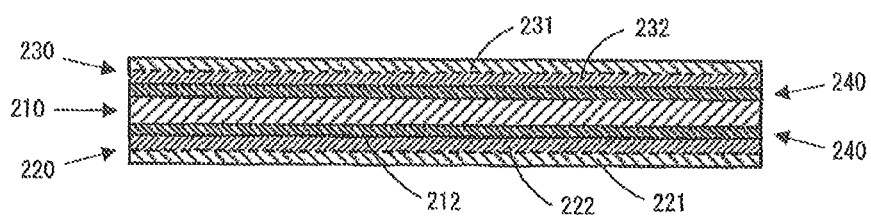
FIG. 8 is a sectional view taken along line VIII-VIII in FIG. 5.

As shown in FIGS. 5 and 6, the cleaning sheet 200 has a central portion 200b (referred to as a "cleaning part") and end portions 200a, 200c provided on both sides of the central portion 200b (referred to as "mounting parts") along the width direction (x direction), which will be described below in detail.

The central portion 200b of the cleaning sheet 200 is placed on the lower side 111 of the head 110, and the end portions 200a, 200c are placed on the upper side 112. Specifically, the cleaning sheet 200 is attached to the head 110 such that the head 110 is covered with the central portion 200b and the end portions 200a, 200c. In the state in which the end portions 200a, 200c of the cleaning sheet 200 are placed on the upper side 112, points of the end portions 200a, 200c which are located right above the holding members 120 (the holding pieces 121) are pushed in by user's fingers. Thus, the end portions 200a, 200c of the cleaning sheet 200 are caught in part and removably held between the adjacent (opposed) holding pieces 121. In this embodiment, the holding member 120 and the holding piece 121 are features that correspond to the "holding member" and the "holding piece", respectively, according to this invention.

Further, in a cleaning operation using the cleaning tool 100 of this embodiment, generally, the head 110 is moved in a direction (the width direction) transverse to a direction (the length direction) along a boundary (e.g. folding lines 201, 202 which are described below) between the central portion 200b and the end portion 200a or 200c. The head 110 can also be moved in the other directions.

An embodiment of a cleaning sheet 200 for use with the cleaning tool 100 of this embodiment is now explained.

Figure 3:
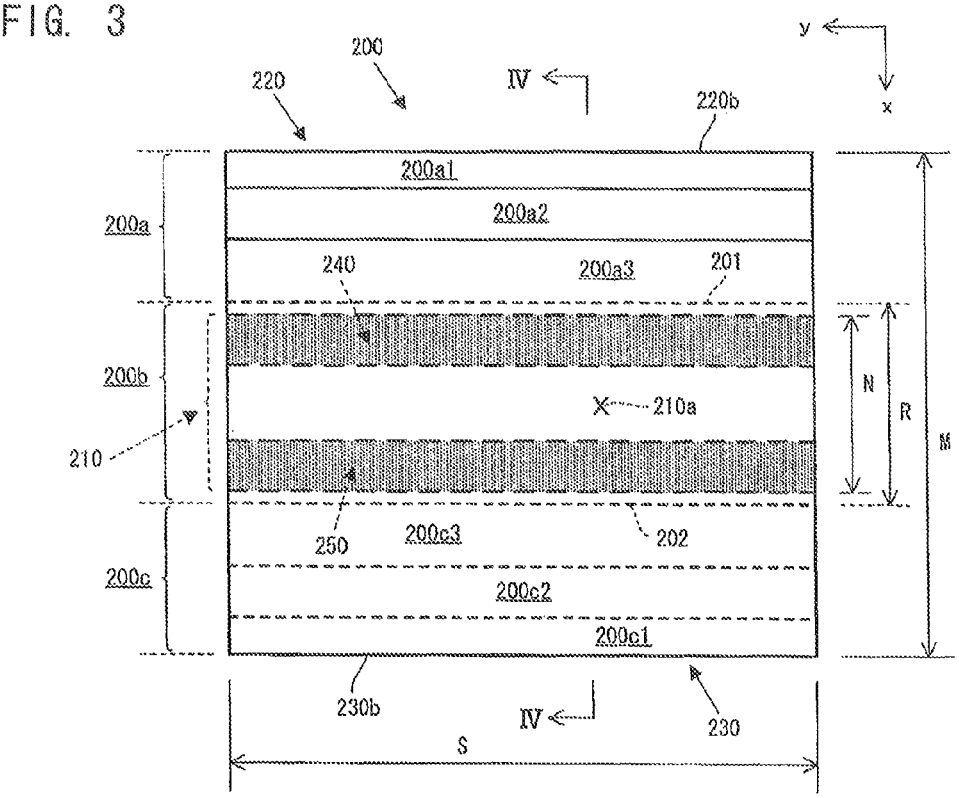
FIG. 3 is a schematic view showing the structure of a cleaning sheet 200 according to a first embodiment.
Figure 4:
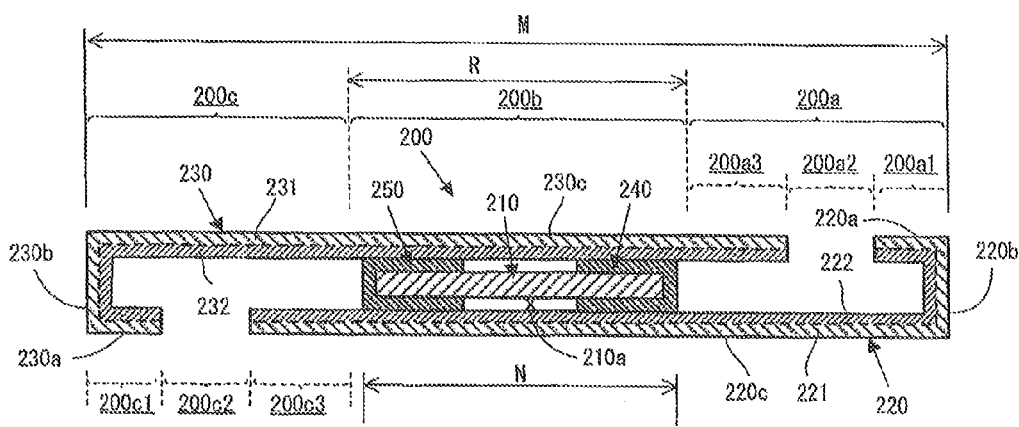
FIG. 4 is a sectional view taken along line IV-IV in FIG. 3.

As shown in FIGS. 3 and 4, the cleaning sheet 200 of this embodiment has a multi-layer structure having an inner layer sheet 210, outer layer sheets 220, 230 disposed on the both sides of the inner layer sheet 210 and intermediate layer sheets 240, 250 disposed between the inner layer sheet 210 and the outer layer sheet 220 (or between the inner layer sheet 210 and the outer layer sheets 220 and 230). Further, the "cleaning sheet having a multi-layer structure" here includes not only a cleaning sheet having a multi-layer structure across its entire region, but a cleaning sheet having a multi-layer structure in its main cleaning region (e.g. the central portion 200b) and having a single-layer structure in the other regions.

A hydrophilic nonwoven fabric sheet is used as the inner layer sheet 210. It is essential for the hydrophilic nonwoven fabric sheet to be hydrophilic as a whole, and the nonwoven fabric sheet may be formed of hydrophilic fibers and hydrophobic fibers. The hydrophilic fibers include rayon fibers, cotton fibers and pulp fibers. In this embodiment, the nonwoven fabric sheet is formed only of rayon fiber having high water absorbency and high moisture retentivity.

A nonwoven fabric sheet (spun lace nonwoven fabric sheet) manufactured by a water jet method (hydroentangling method) is used as the inner layer sheet 210. In the water jet method, spun lace nonwoven fabric of intertwined fibers is manufactured by jetting high-pressure water, for example, onto a web of randomly arranged fibers from a plurality of nozzles disposed in an orientation transverse to the direction of feed of the web. In this embodiment, each of the nozzles for jetting high-pressure water has orifices having a diameter of 92 μm and continuously arranged over the width of 2.0 mm and such nozzles are arranged at intervals (orifice pitches) of 3.0 mm. By using such nozzles, air-through portions are formed in the spun lace nonwoven fabric, and a striped pattern appears on a finished spun lace nonwoven fabric. Thus, the specific volume ratio of the inner layer sheet 210 increases, so that the amount of impregnation (the amount of water retention) of the inner layer sheet 210 increases. The striped pattern is a feature that corresponds to the pattern of the "patterned indented surface of the inner layer sheet" according to this invention. The orifice pitch (interval of indentations) is set within the range of 2.0 to 10.0 mm, or more suitably, within the range of 2.0 to 3.0 mm. If the orifice pitch exceeds 10.0 mm, fibers are more loosely entangled with each other, so that fluff loss of fibers increases. Further, the strength decreases, so that it is difficult to form the nonwoven fabric sheet only of hydrophilic fibers. The inner layer sheet 210 may also include nonwoven fabric sheets manufactured by other methods, such as through-air bonding, spun bonding, thermal bonding, point bonding, melt blowing, chemical bonding and air-laid methods.

The basis weight of the inner layer sheet 210 is preferably set within the range of 30 to 100 gsm, or more suitably, within the range of 50 to 70 gsm in terms of the amount of release of the cleaning solution.

The inner layer sheet 210 is a feature that corresponds to the "third sheet" according to this invention.

A hydrophobic nonwoven fabric sheet is used as the outer layer sheets 220, 230. It is essential for the hydrophobic nonwoven fabric sheet to be hydrophobic as a whole, and the nonwoven fabric sheet may be formed of hydrophilic fibers and hydrophobic fibers. The hydrophobic fibers include polyethylene terephthalate (PET) fibers, polypropylene (PP) fibers, polyethylene (PE) fibers and nylon fibers.

Further, in this embodiment, a spun lace nonwoven fabric sheet manufactured by a water jet method (hydroentangling method) is used as the outer layer sheets 220, 230. Nonwoven fabric sheets manufactured by various other methods may also be used as the outer layer sheets 220, 230.

One of the outer layer sheets 220, 230 and the other are features that correspond to the "first sheet" and the "second sheet", respectively, according to this invention. Further, the "first sheet" corresponds to either one of the outer layer sheets 220, 230 which comes in contact with an object to be cleaned in cleaning operation with the cleaning sheet 200 attached to the head 110.

In the cleaning sheet 200 of this embodiment, as shown in FIG. 4, the outer layer sheet 220 (230) has a two-layer structure having a layer (inner layer) 222 (232) facing the inner layer sheet 210, and a layer (outer layer) 221 (231) on the opposite side from the side facing the inner layer sheet 210.

In this embodiment, the outer layer sheets 220, 230 are formed of fibers mainly consisting of thermoplastic fibers. Thermoplastic fibers forming the inner layers 222, 232 have a lower melting point than thermoplastic fibers forming the outer layers 221, 231.

The outer layers 221, 231 consist, for example, of thermoplastic fibers of polyethylene terephthalate (PET) in major proportions and the rest are rayon fibers. For example, the compounding ratio of polyethylene terephthalate (PET) fibers and rayon fibers is 80% by weight:20% by weight. Preferably, the outer layers 221, 231 consist of hydrophilic fibers of 10 to 30% by weight and hydrophobic fibers of 90 to 70% by weight. Further, the polyethylene terephthalate (PET) fibers consist of those having a fineness of 1.1 dtex and those having a fineness of 3.3 dtex at the ratio of 30% by weight: 50% by weight.

As the thermoplastic fibers forming the inner layers 222, 232, polyethylene (PE) fibers/polyethylene terephthalate (PET) fibers (core-in-sheath structure) having a fineness of 2.2 dtex are used. For example, the compounding ratio of polyethylene (PE) fibers/polyethylene terephthalate (PET) fibers and rayon fibers is 70% by weight:30% by weight. Preferably, the inner layers 222, 232 consist of hydrophilic fibers of 20 to 60% by weight and hydrophobic fibers of 80 to 40% by weight.

The basis weight of the outer layer sheets 220, 230 is preferably set within the range of 35 to 40 gsm in terms of functionality, productivity, costs, etc., though, if it exceeds 30 gsm, there is no particular problem in terms of the amount of release of the cleaning solution.

A hydrophobic nonwoven fabric sheet or a hydrophilic nonwoven fabric sheet can be used as the intermediate layer sheets 240, 250. It is essential for the hydrophobic nonwoven fabric sheet to be hydrophobic as a whole, and the nonwoven fabric sheet may be formed of hydrophobic fibers and hydrophilic fibers. For example, the above-described fibers can be used as the hydrophobic fibers. Further, it is essential for the hydrophilic nonwoven fabric sheet to be hydrophilic as a whole, and the nonwoven fabric sheet may be formed of hydrophilic fibers and hydrophobic fibers. In this embodiment, the hydrophobic nonwoven fabric sheet is used as the intermediate layer sheets 240, 250. Further, a spun bonding nonwoven fabric sheet manufactured by a spun bonding method can be used as the intermediate layer sheets 240, 250. Naturally, nonwoven fabric sheets manufactured by various other methods may also be used as the intermediate layer sheets 240, 250. Further, a film (sheet) made of synthetic resin can also be used as the intermediate layer sheets 240, 250. In this case, a film having an opening is used in order to allow the cleaning solution to be released from the inner layer sheet 210 to the outer layer sheets 220, 230.

The intermediate layer sheets 240, 250 are features that correspond to the "fourth sheet" according to this invention.

By thus forming the inner layers 222, 232 of the outer layer sheets 220, 230 by using thermoplastic fibers having a lower melting point than thermoplastic fibers of the outer layers 221, 231, even if the inner layer sheet 210 contains no thermoplastic fibers, the inner layer sheet 210 and the outer layer sheets 220, 230 can be bonded together by the thermoplastic fibers having a lower melting point which are contained in the inner layer 222 of the outer layer sheet 220 and the inner layer 232 of the outer layer sheet 230.

When the outer layer sheet 220 (230) having the inner layer 222 (232) and the outer layer 221 (231) is heated at a temperature which is higher than the melting point of the thermoplastic fibers of the inner layer 222 (232) and lower than the melting point of the thermoplastic fibers of the outer layer 221 (231), a fusion bonded layer is formed in the inner layer 222 (232). As a result, most of the fibers in the inner layer 222 (232) of the outer layer sheet 220 (230) are joined together by fusion bonding, so that the amount of cleaning solution which is released from the inner layer sheet 210 to the outer layer sheet 220 (230) is controlled, or particularly, the property of releasing cleaning solution can be controlled.

The known cleaning sheet (see Japanese non-examined laid-open Patent Publication No. 2007-20615) has a loosely entangled portion in its central portion, but each of its end portions has a substantially uniform elongation rate across its entire region. Therefore, during cleaning operation which is performed with the end portions of the cleaning sheet held by the holding members of the head of the cleaning tool, the cleaning sheet easily becomes detached from the holding members.

Therefore, in this invention, each of the ends of the cleaning sheet has a first part having a first elongation rate and a second part having an elongation rate higher than the first elongation rate. The second part is disposed on the central portion side of the first part, and a boundary between the first and second parts is formed at a position such that it can be held by the holding members 120 of the head 110 of the cleaning tool.

The inner layer sheet 210, the outer layer sheets 220, 230 and the intermediate layer sheets 240, 250 are arranged as shown in FIGS. 3 and 4. FIG. 4 is a sectional view taken along line IV-IV in FIG. 3.

As shown in FIG. 3, the cleaning sheet 200 has a rectangular shape having a width M (e.g. 205 mm) in the x direction and a length S (e.g. 275 mm) in the y direction. The inner layer sheet 210 has a rectangular shape having a width N (e.g. 90 mm) and the length S. The outer layer sheets 220, 230 have a rectangular shape having a width (e.g. 190 mm) shorter than the width M and the length S.

The outer layer sheet 220 (230) has a base 220c (230c) and a folded part 220a (230a) having a predetermined fold length from its one edge in the width direction (x direction). The folded part 220a (230a) is folded over to the inner layer 222 (232) side along a folding line 220b (230b) and overlaid on part of the base 220c (230c). As shown in FIG. 4, the outer layer sheets 220, 230 having the respective folded parts 220a, 230a are disposed on the both sides of the inner layer sheet 210. At this time, the inner layer 222 of the outer layer sheet 220 and the inner layer 232 of the outer layer sheet 230 are disposed on the inner layer sheet 210 side (so as to be opposed to each other). Further, the inner layer sheet 210 is centrally located in the direction of the width M. The folded parts 220a, 230a of the outer layer sheets 220, 230 are disposed on the opposite sides of the inner layer sheet 210 in the width direction. Further, the folding lines 201, 202 are provided in the cleaning sheet 200 toward the center in the width direction and spaced a distance R apart from each other which is equal to or longer than the width N of the inner layer sheet 210 (R≥N).

Thus, as shown in FIG. 3, the cleaning sheet 200 is divided into the centrally located central portion 200b and the end portions 200a, 200c provided on the opposite sides of the central portion 200b in the width direction by the folding lines 201, 202. The end portion 200a (200c) has, from one end (the other end) in the width direction, a first part 200a1 (200c1) of a two-layer structure having the folded part 220a (230a) and part of the base 220c (230c) of the outer layer sheet 220 (230), a second part 200a2 (200c2) of a single-layer structure having the base 220c (230c) of the outer layer sheet 220 (230), and a third part 200a3 (200c3) of a two-layer structure having the base 220c of the outer layer sheet 220 and the base 230c of the outer layer sheet 230. The central portion 200b has a multi-layer structure having the base 220c of the outer layer sheet 220, the base 230c of the outer layer sheet 230, the inner layer sheet 210 and the intermediate layer sheets 240, 250.

The folding lines 201, 202 serve as guides for positioning the central portion 200b of the cleaning sheet 200 such that the central portion 200b faces the lower side (cleaning side) 111 of the head 110 when the cleaning sheet 200 is attached to the head 110 of the cleaning tool 100. A width R of the central portion 200b of the cleaning sheet 200 (distance between the folding lines 201, 202) is preferably equal to or longer than a width W of the lower side (cleaning side) 111 of the head 110 of the cleaning tool 100 (R≥W). Further, the width N of the inner layer sheet 210 is preferably equal to or shorter than the width W of the lower side (cleaning side) 111 of the head 110 of the cleaning tool 100 (N≤W). The relationship between the distance R, the width N and the width W is not limited to this.

In order to realize easier attachment of the cleaning sheet 200 to the head 110, it is desired to be constructed such that a user can readily recognize the central portion 200b of the cleaning sheet 200. In order to solve this problem, it is conceivable to knead a pigment into the inner layer sheet 210. When this method is used, however, it is difficult to obtain the inner layer sheet 210 having desired properties. Therefore, in this embodiment, a colored hydrophobic intermediate layer sheet is disposed between the inner layer sheet 210 and the outer layer sheet 220 (or between the inner layer sheet 210 and the outer layer sheets 220, 230).

In this case, frictional force acting between the outer layer sheet 220 and the intermediate layer sheet may become lower than frictional force between the inner layer sheet 210 and the outer layer sheet 220. Further, if bonded portions are reduced in order to reduce the amount of release of the cleaning solution from the inner layer sheet 210 to the outer layer sheet 220 via the bonded portions, bonding strength between the outer layer sheet 220 and the intermediate layer sheet may be reduced. Therefore, during cleaning operation, the outer layer sheet 220 may be partly moved with respect to the intermediate layer sheet by frictional force acting between the object to be cleaned and the outer layer sheet 220, so that the outer layer sheet 220 may become wrinkled.

Therefore, in this embodiment, the intermediate layer sheet is disposed between the inner layer sheet 210 and the outer layer sheet 220 such that at least part of the inner layer sheet 210 can come in contact with the outer layer sheet 220.

In this embodiment, colored first and second intermediate layer sheets 240, 250 are used as the intermediate layer sheet. As shown in FIG. 4, the first and second intermediate layer sheets 240, 250 are folded over so as to form a space having an opening, or specifically to have a V-shaped or U-shaped section. Both ends of the inner layer sheet 210 in the width direction (x direction) are inserted into the space of the first intermediate layer sheet 240 and the space of the second intermediate layer sheet 250, respectively, so that the inner layer sheet 210 and the intermediate layer sheets are overlaid one on another at the both ends of the inner layer sheet 210 in the width direction.

In this embodiment, with the construction in which the colored first and second intermediate layer sheets 240, 250 are disposed on the both ends of the inner layer sheet 210 in the width direction (x direction), the user can readily recognize the central portion 200b of the cleaning sheet 200. Further, part of the inner layer sheet 210 comes in contact with the outer layer sheet 220 via a space 210a between the first and second intermediate layer sheets 240, 250, so that high frictional force acts between the inner layer sheet 210 and the outer layer sheet 220. Therefore, the outer layer sheet 210 cannot easily move with respect to the first and second intermediate layer sheets 240, 250. With such a construction, even if frictional force acting between the outer layer sheet 220 and the first and second intermediate layer sheets 240, 250 is low, the outer layer sheet 220 can be prevented from becoming wrinkled by frictional force acting between the object to be cleaned and the outer layer sheet 220 during cleaning operation.

The cleaning sheet 200 as shown in FIGS. 5 to 10 can be obtained by arranging the inner layer sheet 210, the outer layer sheets 220, 230 and the first and second intermediate layer sheets 240, 250 as shown in FIGS. 3 and 4 and bonding them together. Further, FIG. 5 shows the cleaning sheet 200 in the unfolded state. FIGS. 6 to 10 are sectional views taken along line VI-VI, line VIII-VII, line VIII-VIII, line IX-IX and line X-X in FIG. 5, respectively.

When the inner layer sheet 210 is bonded to the outer layer sheets 220, 230 at the bonded portions, the cleaning solution is released from the inner layer sheet 210 to the outer layer sheets 220, 230 via the bonded portions. Therefore, it is preferable to minimize the bonded portions between the inner layer sheet 210 and the outer layer sheets 220, 230 and first and second intermediate layer sheets 240, 250. In this embodiment, as shown in FIGS. 5 and 6, in the central portion 200b, the inner layer sheet 210, the outer layer sheets 220, 230 and the first and second intermediate layer sheets 240, 250 are bonded together by hot embossed portions 203 and bonded portions 203a which are formed by hot embossing.

Figure 9:
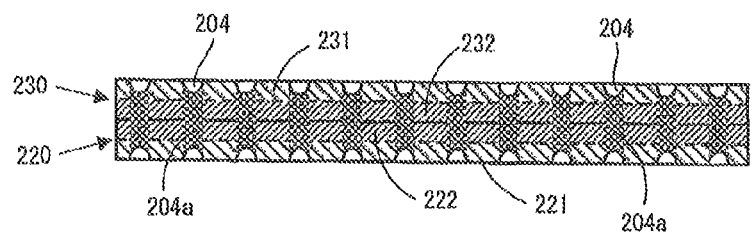
FIG. 9 is a sectional view taken along line IX-IX in FIG. 5.
Figure 10:
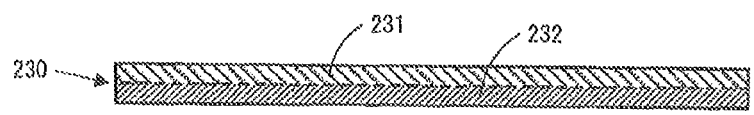
FIG. 10 is a sectional view taken along line X-X in FIG. 5.

Further, in end portions 200a, 200c of the cleaning sheet 200, the outer layer sheets 220, 230 are bonded together in order to prevent the cleaning solution impregnated in the inner layer sheet 210 from seeping through its both end portions in the width direction (x direction). In this embodiment, as shown in FIG. 6, in the third part 200a3 (200c3) of the end portion 200a (200c), the outer layer sheets 220, 230 are bonded together. In this embodiment, the outer layer sheets are bonded together by hot embossing using a roller having depressions and projections. As shown in FIG. 9, the outer layer sheets 220, 230 are bonded by hot embossed portions 204 and bonded portions 204a which are formed by hot embossing.

In this embodiment, thermoplastic fibers having a lower melting point are disposed in the outer layer sheets 220, 230. Further, the inner layer sheet 210 is not disposed in the third parts 200a3, 200c3. Therefore, in the third parts 200a3, 200c3, the outer layer sheets 220, 230 can be easily bonded together by hot embossing.

The strength of the third parts 200a3, 200c3 is increased by bonding the outer layer sheets 220, 230 by hot embossing.

In this embodiment, in order to make the elongation rate of the first part 200a1 (200c1) lower than that of the second part 200a2 (200c2), the folded part 220a and part of the base 220c of the outer layer sheet 220 (the folded part 230a and part of the base 230c of the outer layer sheet 230) are bonded together in the first part 200*a*1 (200*c*1). In this embodiment, they are bonded together by hot embossing using a roller having depressions and projections.

In this embodiment, thermoplastic fibers having a lower melting point are contained in the outer layer sheet 220 (230). Further, the inner layer sheet 210 is not disposed between the folded part 220*a* and the base 220*c* of the outer layer sheet 220 (the folded part 230*a* and the base 230*c* of the outer layer sheet 230). Therefore, in the first part 200*a*1 (200*c*1), the folded part 220*a* and part of the base 220*c* of the outer layer sheet 220 (the folded part 230*a* and part of the base 230*c* of the outer layer sheet 230) can be easily bonded together by hot embossing.

By this hot embossing, the first part 200*a*1 formed by the folded part 220*a* and part of the base 220*c* of the outer layer sheet 220 and the first part 200*c*1 formed by the folded part 230*a* and part of the base 230*c* of the outer layer sheet 230 have a lower elongation rate than the second parts 200*a*2, 200*c*2. Specifically, the first parts 200*a*1, 200*c*1 are not as stretchy as the second parts 200*a*2, 200*c*2.

The elongation rate (mm/N) of the sheet is a measure of stretchiness. The higher the elongation rate, the stretchier the sheet.

Further, slits 205 are formed in the end portions 200*a*, 200*c* of the cleaning sheet 200. The slits 205 are designed such that they can be engaged with the holding pieces 121 when the user locks the end portions 200*a*, 200*c* of the cleaning sheet 200 by the holding pieces 121 of the holding members 120. The shape, location and number of the slits 205 are appropriately selected. By provision of the slits 205, the user can more easily lock the end portions 200*a*, 200*c* of the cleaning sheet 200 by the holding members 120 (the holding pieces 121) of the head 110.

Further, the inner layer sheet 210 is impregnated with cleaning solution. An appropriate cleaning solution by which dirt or contamination of the object to be cleaned can be removed can be used as the cleaning solution. For example, water-based cleaning solution containing alcohol, a surfactant, a solvent, an antiseptic, etc. can be used. Further, a floor protective agent, an abrasive, a freshener, perfume, etc. may be added to the cleaning solution. The amount of cleaning solution to be impregnated into the inner layer sheet 210 can be appropriately determined. For example, with respect to the weight of the yet-to-be impregnated cleaning sheet 200 (the inner layer sheet 210, the outer layer sheets 220, 230 and the intermediate layer sheets 240, 250), two to five times its volume of the cleaning solution is impregnated into the inner layer sheet 210. Various methods can be used for impregnating the cleaning solution into the inner layer sheet 210. For example, the cleaning sheet 200 may be formed by using the inner layer sheet 210 which is impregnated with the cleaning solution in advance. Alternatively, after the cleaning sheet 200 is formed, the cleaning solution may be applied to the central portion 200*b* of the outer layer sheets 220, 230 so that the inner layer sheet 210 is impregnated with the cleaning solution via the outer layer sheets 220, 230 and the intermediate layer sheets 240, 250.

Figure 11:
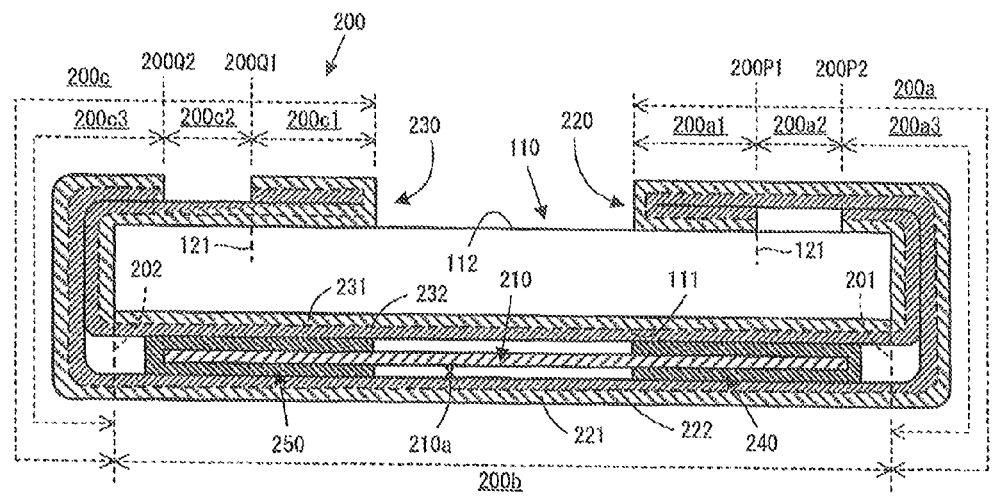
FIG. 11 is a sectional view taken along line XI-XI in FIG. 2.

FIG. 11 shows the cleaning sheet 200 in this embodiment which is attached to the head 110. FIG. 11 is a sectional view taken along line XI-XI in FIG. 2.

As shown in FIG. 11, the central portion 200*b* of the cleaning sheet 200 is placed on the lower side (cleaning side) 111 of the head 110. The end portions 200*a*, 200*c* of the cleaning sheet 200 are folded over along the folding lines 201, 202 and placed on the upper side 112 of the head 110. In this embodiment, the length of the first parts 200*a*1, 200*c*1 (the length of the folded parts 220*a*, 230*a*) is set to 20 mm. Therefore, when the central portion 200*b* of the cleaning sheet 200 is placed on the lower side (cleaning side) 111 of the head 110, and the end portions 200*a*, 200*c* are placed on the upper side 112 of the head 110, part of a boundary 200P1 between the first part 200*a*1 and the second part 200*a*2 and part of a boundary 200Q1 between the first part 200*c*1 and the second part 200*c*2 are placed to face the holding members 120 (the holding pieces 121). In this state, when the portions of the sheet facing the holding pieces 121 are pushed in through the holding pieces 121 by the fingers and then released, parts of the boundary 200P1 and the boundary 200Q1 are caught and held between the holding pieces 121. Further, the parts of the boundary 200P1 and the boundary 200Q1 caught between the holding pieces 121 are pushed in through the holding pieces facing each other by the user's fingers (see FIG. 12). At this time, as shown in FIG. 11, the first parts 200*a*1, 200*c*1 are located inward of the second parts 200*a*2, 200*c*2 or toward the center of the head 110 (on the opposite side from the central portion 200*b*) and held by the holding pieces 121.

In this embodiment, part of the boundary 200P1 (200Q1) between the first part 200*a*1 (200*c*1) having a lower elongation rate and the second part 200*a*2 (200*c*2) having a higher elongation rate is caught by the holding pieces 121 facing each other. Specifically, a point of change in the elongation rate of the sheet is held by the holding pieces 121. Therefore, even if a tensile force acts upon the cleaning sheet 200 in a direction opposite to the direction of movement of the head 110 (for example, the horizontal direction as viewed in FIG. 11) by a frictional force between the object to be cleaned and the outer layer sheet 220 during cleaning operation, the second part 200*a*2 or 200*c*2 having a higher elongation rate can effectively absorb the tensile stress, so that the end portion 200*a* or 200*c* of the cleaning sheet 200 can be prevented from becoming detached from the holding pieces 121.

Further, in order to detach the cleaning sheet 200 from the head 110, the first part 200*a*1 (200*c*1) having a lower elongation rate is pulled so that the boundary 200P1 (200Q1) can be easily pulled out through the holding pieces 121. Thus, the cleaning sheet 200 can be easily detached from the head 110.

In this embodiment, the second part 200*a*2 (200*c*2) having a higher elongation rate is designed as a single-layer structure, and the first part 200*a*1 (200*c*1) having a lower elongation rate is designed as a two-layer structure formed by folding over a sheet element. With such a construction, the cleaning tool having the first part 200*a*1 (200*c*1) and the second part 200*a*2 (200*c*2) which are different in elongation rate can be easily manufactured at lower costs.

In this embodiment, with the construction in which the number of thicknesses (two thicknesses) of the first part 200*a*1 (200*c*1) is different from the number of thicknesses (single thickness) of the second part 200*a*2 (200*c*2), the boundary 200P1 (200Q1) between the first part 200*a*1 (200*c*1) and the second part 200*a*2 (200*c*2) can be readily recognized, so that the cleaning sheet 200 can be easily attached to the head 110.

Figure 12:
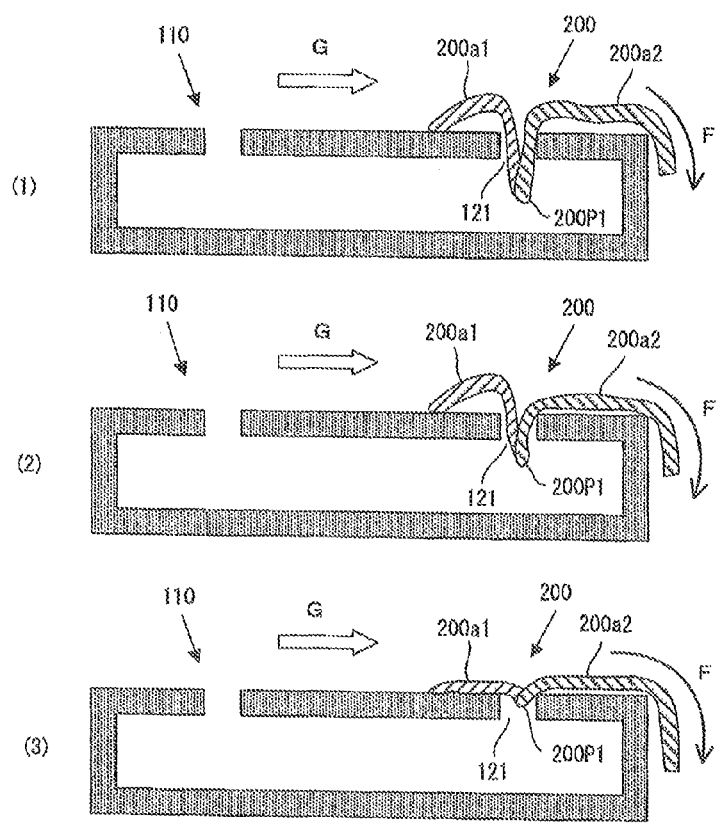
FIG. 12 is a view for illustrating operation of the cleaning sheet 200 according to the first embodiment.

Operation of the cleaning sheet 200 of this embodiment is conceptually explained with reference to FIG. 12. In FIG. 12, for the sake of simplicity of explanation, as for the cleaning sheet 200, only the first and second parts 200*a*1, 200*a*2 of the end portion 200*a* are shown. Further it is assumed that part of the boundary 200P1 between the first and second parts 200*a*1, 200*a*2 of the end portion 200*a* is held by the holding members 120 (the holding pieces 121) of the head 110 and the head 110 is moved in a direction shown by the arrow G (rightward) in FIG. 11. The part of the boundary 200Q1 held between the holding pieces 121 is pushed in through the holding pieces.

When the head 110 is moved in the direction of the arrow G, as shown in FIG. 12(1), by frictional force acting between the object to be cleaned and the outer layer sheet 220, a tensile stress acts in the direction of the arrow F upon the second part 200a2 of the end portion 200a disposed in the direction of the arrow G.

In the prior art, the cleaning sheet has a loosely entangled portion in its central portion and tightly entangled portions on the both ends, but each of the end portions of the sheet has a substantially uniform elongation rate across its entire region. Therefore, the loosely entangled portion is ineffective in absorbing a tensile stress F. Thus, the sheet element held by the holding members 120 (the holding pieces 121) uniformly stretches, so that the end portion 200a (200c) of the cleaning sheet 200 easily becomes detached from the holding members 120 (the holding pieces 121).

In this embodiment, as shown in FIG. 12(2), part of the boundary 200P1 between the first part 200a1 having a lower elongation rate and the second part 200a2 having a higher elongation rate is held by the holding pieces 121, so that the second part 200a2 having the higher elongation rate becomes stretchy and can effectively absorb the tensile stress. In this case, part of the boundary 200P1 between the first part 200a1 and the second part 200a2 is kept held by the holding pieces 121.

When the tensile stress acting upon the end portion 200a (200c) of the cleaning sheet 200 increases, as shown in FIG. 12(3), the boundary 200P1 between the first part 200a1 and the second part 200a2 is pulled out through the holding pieces 121. In this case, the end portion 200a (200c) of the cleaning sheet 200 is detached from the holding pieces 121.

Further, by pulling the first part 200a1 having a lower elongation rate, the end portion 200a (200c) of the cleaning sheet 200 can be easily detached from the holding pieces 121.

A method of arranging the intermediate layer sheet between the inner layer sheet 110 and the outer layer sheet 120 such that part of the inner layer sheet 110 can come in contact with the outer layer sheet 120 is not limited to the above-described method.

Figure 13:
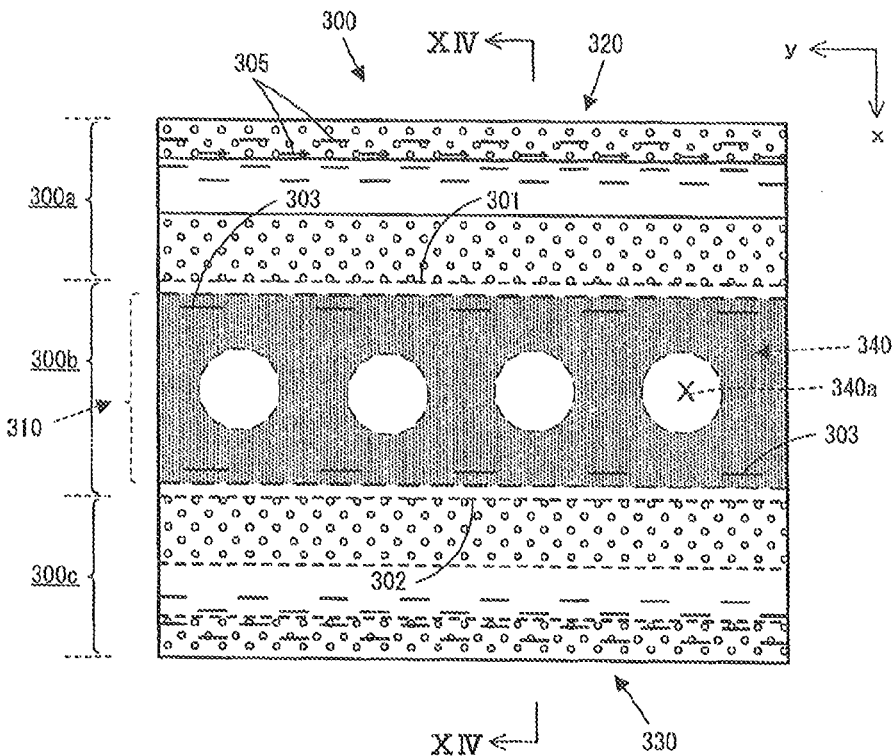
FIG. 13 shows a cleaning sheet 300 according to a second embodiment in an unfolded state.
Figure 14:
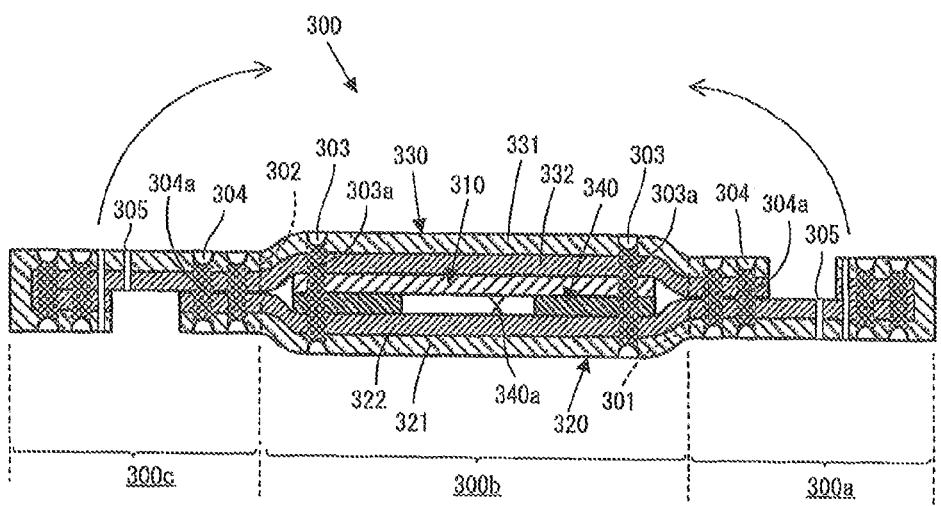
FIG. 14 is a sectional view taken along line XIV-XIV in FIG. 13.

A cleaning sheet 300 of a second embodiment is now explained with reference to FIGS. 13 and 14. FIG. 13 shows the cleaning sheet 300 of the second embodiment in the unfolded state. FIG. 14 is a sectional view taken along line XIV-XIV in FIG. 13.

The cleaning sheet 300 of the second embodiment is different from the cleaning sheet 200 of the first embodiment only in the construction of the intermediate layer sheet. Therefore, only the construction of the intermediate layer sheet in the cleaning sheet 300 of the second embodiment is now explained.

The cleaning sheet 300 of this embodiment has an intermediate layer sheet 340. The intermediate layer sheet 340 can be formed by the same material as the above-described intermediate layer sheets 240, 250. The intermediate layer sheet 340 has the same (or substantially the same) surface area as an inner layer sheet 310 and has a plurality of openings 340a along the length direction (y direction) transverse to the width direction (x direction). Further, the intermediate layer sheet 340 is disposed between the inner layer sheet 310 and an outer layer sheet 320 and bonded to the inner layer sheet 310 and the outer layer sheets 320, 330 by hot embossed portions 303a and bonded portions 303.

In this embodiment, a central portion 300b of the cleaning sheet 300 can be readily recognized by the colored intermediate layer sheet 340. Further, the inner layer sheet 310 can come in contact with the outer layer sheet 320 via the openings 340a formed in the intermediate layer sheet 340.

Figure 15:
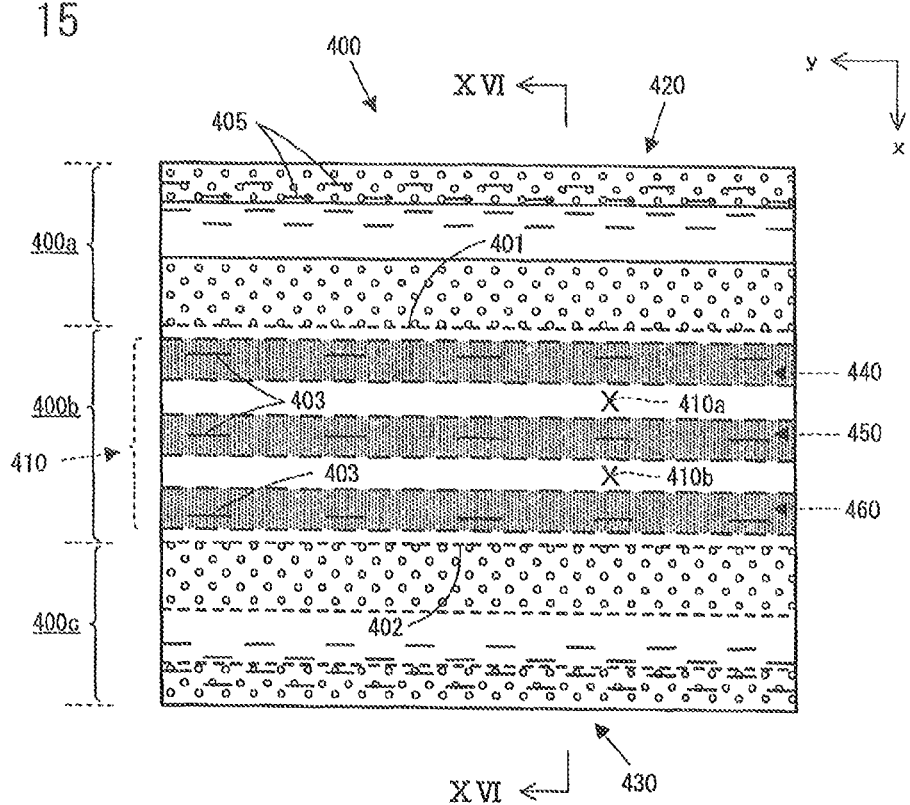
FIG. 15 shows a cleaning sheet 400 according to a third embodiment in an unfolded state.
Figure 16:
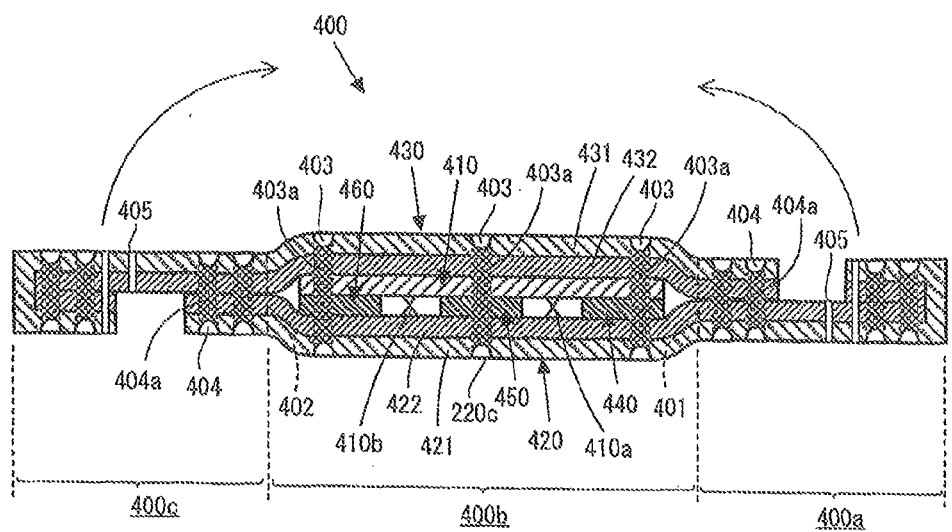
FIG. 16 is a sectional view taken along line XVI-XVI in FIG. 15.

A cleaning sheet 400 of a third embodiment is now explained with reference to FIGS. 15 and 16. FIG. 15 shows the cleaning sheet 400 of the third embodiment in the unfolded state. FIG. 16 is a sectional view taken along line XVI-XVI in FIG. 15.

The cleaning sheet 400 of the third embodiment is different only in the construction of the intermediate layer sheet from the cleaning sheet 200 of the first embodiment. Therefore, only the construction of the intermediate layer sheet in the cleaning sheet 400 of the third embodiment is now explained.

The cleaning sheet 400 of this embodiment has a first intermediate layer sheet 440, a second intermediate layer sheet 450 and a third intermediate layer sheet 460. The first to third intermediate layer sheets 440, 450, 460 can be formed by the same material as the above-described intermediate layer sheets 240, 250. Each of the first to third intermediate layer sheets 440, 450, 460 has a smaller surface area than an inner layer sheet 410. Further, the first to third intermediate layer sheets 440, 450, 460 are disposed between the inner layer sheet 410 and an outer layer sheet 420 and spaced apart from each other in the width direction (x direction). The first to third intermediate layer sheets 440, 450, 460 are bonded to the inner layer sheet 410 and the outer layer sheets 420, 430 by hot embossed portions 403a and bonded portions 403.

In this embodiment, a central portion 400b of the cleaning sheet 400 can be readily recognized by the colored first to third intermediate layer sheets 440, 450, 460. Further, the inner layer sheet 410 can come in contact with the outer layer sheet 420 via spaces 410a, 410b between adjacent ones of the first to third intermediate layer sheets 440, 450, 460.

Figure 17:
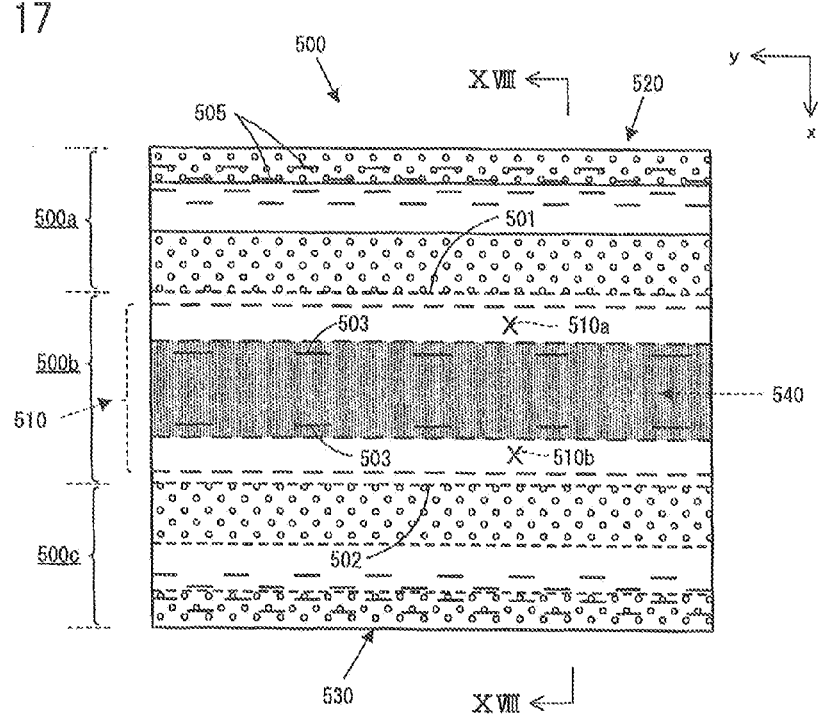
FIG. 17 shows a cleaning sheet 500 according to a fourth embodiment in an unfolded state.
Figure 18:
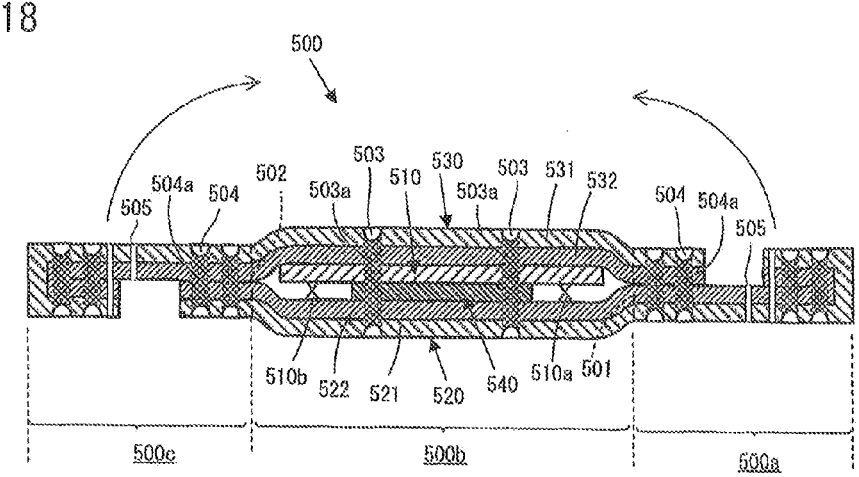
FIG. 18 is a sectional view taken along line XVIII-XVIII in FIG. 17.

A cleaning sheet 500 of a fourth embodiment is now explained with reference to FIGS. 17 and 18. FIG. 17 shows the cleaning sheet 500 of the fourth embodiment in the unfolded state. FIG. 18 is a sectional view taken along line XVII-XVII in FIG. 17.

The cleaning sheet 500 of the fourth embodiment is different only in the construction of the intermediate layer sheet from the cleaning sheet 200 of the first embodiment. Therefore, only the construction of the intermediate layer sheet in the cleaning sheet 500 of the fourth embodiment is now explained.

The cleaning sheet 500 of this embodiment has an intermediate layer sheet 540. The intermediate layer sheet 540 can be formed by the same material as the above-described intermediate layer sheets 240, 250. The intermediate layer sheet 540 has a smaller surface area than an inner layer sheet 510. Further, the intermediate layer sheet 540 are disposed between the inner layer sheet 510 and an outer layer sheet 520 and located in the center of the cleaning sheet 500 in the length direction (y direction) transverse to the width direction (x direction). The intermediate layer sheet 540 is bonded to the inner layer sheet 510 and the outer layer sheets 520, 530 by hot embossed portions 503a and bonded portions 503.

In this embodiment, a central portion 500b of the cleaning sheet 500 can be readily recognized by the colored intermediate layer sheet 540. Further, the inner layer sheet 510 can come in contact with the outer layer sheet 520 via spaces 510a, 510b on the both sides of the intermediate layer sheets 540 in the width direction.

This invention is not limited to the constructions that have been described as the representative embodiments, but rather, may be added to, changed, replaced with alternatives or otherwise modified.

Each of the features or constructions that have been described in the above embodiments can be used singly or in combination of appropriately selected ones of them.

The method of bonding the inner layer sheet to the outer layer sheet and the intermediate sheet and the method of bonding the outer layer sheets to each other are not limited to the hot embossing method, but various other bonding methods can be used.

Usage patterns of the cleaning sheet, or, for example, whether the cleaning sheet is attached to the cleaning sheet mounting member or directly held by user's hand in use, can be selected.

The construction of the cleaning sheet is not limited to those described in the above-described embodiments. For example, the number of the sheets forming the cleaning sheet can be appropriately selected. As the sheets forming the cleaning sheet, sheets formed by various materials or sheets manufactured by various manufacturing methods can be used.

The construction of the cleaning sheet mounting member is not limited to the construction described in the above-described embodiments.

In the above embodiments, the cleaning sheet has an end portion having the first part having a lower elongation rate, the second part having a higher elongation rate and the third part having a lower elongation rate, but the cleaning sheet having only the first part and the second part may also be used. Further, the cleaning sheet having a substantially uniform elongation rate across its entire region may also be used.

Further, the cleaning sheet is formed by using the inner layer sheet and the outer layer sheet which have different surface areas, but the cleaning sheet may also be formed by using the inner layer sheet and the outer layer sheet which have the same surface area.

Various methods can be used to change the elongation rates of the first and second parts. For example, a method of changing the number of thicknesses of the sheets, or a method of using the sheets which are different in elongation rate can be used.

The intermediate layer sheet may be disposed between the inner layer sheet and one of the outer layer sheets (the first sheet), or it may be disposed between the inner layer sheet and both of the outer layer sheets (the first sheet and the second sheet).

Having regard to the above-described aspect of the invention, following features are provided.

(1) The cleaning tool or cleaning sheet, wherein "a fusion bonded layer is formed in the first sheet and the amount of release of the cleaning solution impregnated in the third sheet from an outer surface of the first sheet is controlled by the fusion bonded layer".

With this construction, the amount of release of the cleaning solution from the outer surface of the first sheet can be controlled.

(2) The cleaning tool or cleaning sheet, wherein "the fusion bonded layer is formed on a side of the first sheet which faces the third sheet".

With this construction, the amount of release of the cleaning solution from the outer surface of the first sheet can be more effectively controlled.

(3) The cleaning tool or cleaning sheet, wherein "the fusion bonded layer is formed in the first and second sheets, and the amount of release of the cleaning solution impregnated in the third sheet from the outer surface of the first sheet is controlled by the fusion bonded layer formed in the first sheet and the amount of release of the cleaning solution impregnated in the third sheet from the outer surface of the second sheet is controlled by the fusion bonded layer formed in the second sheet".

With this construction, the amount of release of the cleaning solution from the outer surfaces of the first and second sheets can be controlled.

(4) The cleaning tool or cleaning sheet, wherein "the fusion bonded layer in the first sheet is formed on a side of the first sheet facing the third sheet and the fusion bonded layer in the second sheet is formed on a side of the second sheet facing the third sheet".

With this construction, the amount of release of the cleaning solution from the outer surfaces of the first and second sheets can be more effectively controlled.

(5) The cleaning tool or cleaning sheet, wherein "at least one end portion has a first part having a first elongation rate and a second part having a higher elongation rate than the first part, and the second part is disposed on the central portion side of the first part in one direction, and at least part of a boundary between the first and second parts is removably held by a holding member".

With this construction, the cleaning sheet can be prevented from becoming detached from the holding member during cleaning operation and easily detached from the holding member.

(6) The cleaning tool or cleaning sheet, wherein "at least one end portion has a third part having a lower elongation rate than the second part, and the third part is disposed on the central portion side of the second part in one direction".

With this construction, the strength of the central portion of the cleaning sheet can be increased.

DESCRIPTION OF NUMERALS 100 cleaning tool
110 head (cleaning sheet mounting member)
120 holding member
121 holding piece
130 pipe
131 connecting mechanism
150 handle
200, 300, 400, 500 cleaning sheet
200a, 200c end portion
200b, 300b central portion (cleaning part)
201, 202, 301, 302, 401, 402, 501, 502 folding line
205, 305, 405, 505 slit
210, 310, 410, 510 inner layer sheet (third sheet)
220, 320, 420, 520 outer layer sheet (first sheet)
230, 330, 430, 530 outer layer sheet (second sheet)
221, 231, 321, 331, 421, 431, 521, 531 outer layer
222, 232, 322, 332, 422, 432, 522, 532 inner layer (fusion bonded layer)
204, 304, 404, 504 bonded portion
204a, 304a, 404a, 504a hot embossed portion

The invention claimed is:

1. A cleaning tool, including a cleaning sheet mounting member and a cleaning sheet, in which the cleaning sheet mounting member has a cleaning side and a holding member and the cleaning sheet has a central portion which is placed on the cleaning side of the cleaning sheet mounting member and an end portion which is formed on at least one side of the central portion in one direction and removably held by the holding member, wherein:

the central portion of the cleaning sheet has a hydrophobic first sheet, a hydrophobic second sheet, a hydrophilic third sheet and a hydrophobic fourth sheet,
the third sheet is impregnated with cleaning solution and disposed between the first sheet and the second sheet, at least part of the fourth sheet is disposed between the first sheet and the third sheet such that part of the third sheet can come in contact with the first sheet, and at least one end portion has a first part having a first elongation rate and a second part having a higher elongation rate than the first part, and the second part is disposed on the central portion side of the first part in one direction, and at least part of a boundary between the first and second parts is removably held by a holding member.

2. The cleaning tool as defined in claim 1, wherein the fourth sheet is folded over so as to form a space having an opening, and an end portion of the third sheet is inserted into the space of the fourth sheet so that part of the fourth sheet is overlaid on the third sheet, and a portion of the third sheet which is not overlaid on the fourth sheet can come in contact with the first sheet.

3. The cleaning tool as defined in claim 1, wherein the fourth sheet has an opening and part of the third sheet can come in contact with the first sheet via the opening of the fourth sheet.

4. The cleaning tool as defined in claim 1, wherein a fusion bonded layer is formed in the first sheet and the amount of release of the cleaning solution impregnated in the third sheet from an outer surface of the first sheet is controlled by the fusion bonded layer.

5. The cleaning tool as defined in claim 4, wherein the fusion bonded layer is formed on a side of the first sheet which faces the third sheet.

6. The cleaning tool as defined in claim 1, wherein the fusion bonded layer is formed in the first and second sheets, and the amount of release of the cleaning solution impregnated in the third sheet from the outer surface of the first sheet is controlled by the fusion bonded layer formed in the first sheet and the amount of release of the cleaning solution impregnated in the third sheet from the outer surface of the second sheet is controlled by the fusion bonded layer formed in the second sheet.

7. The cleaning tool as defined in claim 6, wherein the fusion bonded layer in the first sheet is formed on a side of the first sheet facing the third sheet and the fusion bonded layer in the second sheet is formed on a side of the second sheet facing the third sheet.

8. The cleaning tool as defined in claim 1, wherein at least one end portion has a third part having a lower elongation rate than the second part, and the third part is disposed on the central portion side of the second part in one direction.

9. A cleaning sheet, including a central portion which is placed on a cleaning side of a cleaning sheet mounting member of a cleaning tool and an end portion which is formed on at least one side of the central portion in one direction and removably held by a holding member of the cleaning sheet mounting member, wherein:

the central portion has a hydrophobic first sheet, a hydrophobic second sheet, a hydrophilic third sheet and a hydrophobic fourth sheet, the third sheet is impregnated with cleaning solution and disposed between the first sheet and the second sheet, at least part of the fourth sheet is disposed between the first sheet and the third sheet such that part of the third sheet can come in contact with the first sheet, and at least one end portion has a first part having a first elongation rate and a second part having a higher elongation rate than the first part, and the second part is disposed on the central portion side of the first part in one direction, and at least part of a boundary between the first and second parts is removably held by the holding member.

* * * * *